US005704050A

United States Patent [19]
Redpath

[11] Patent Number: 5,704,050
[45] Date of Patent: Dec. 30, 1997

[54] SNAP CONTROL FOR RELOCATING ELEMENTS OF A GRAPHICAL USER INTERFACE

[75] Inventor: Sarah D. Redpath, Cary, N.C.

[73] Assignee: International Business Machine Corp., Armonk, N.Y.

[21] Appl. No.: 496,486

[22] Filed: Jun. 29, 1995

[51] Int. Cl.⁶ .................................................. G06F 15/00
[52] U.S. Cl. ........................ 395/339; 395/340; 395/342; 395/348
[58] Field of Search ........................ 395/155, 157, 395/159, 326, 339, 340, 342, 348, 349, 350

[56] References Cited

U.S. PATENT DOCUMENTS

| 5,072,412 | 12/1991 | Henderson et al. | 395/158 |
|---|---|---|---|
| 5,140,678 | 8/1992 | Torres | 395/157 |
| 5,227,771 | 7/1993 | Kerr et al. | 345/119 |
| 5,233,687 | 8/1993 | Henderson et al. | 395/158 |
| 5,305,435 | 4/1994 | Bronson | 395/348 |
| 5,347,628 | 9/1994 | Brewer et al. | 395/159 |
| 5,388,196 | 2/1995 | Pajak et al. | 395/340 |

OTHER PUBLICATIONS

IBM Technical Disclosure Bulletin, vol. 37, No. 1, Jan. 1994 New York, US, pp. 455–456, "Free-Space Search for Best- -Fit Placement of New Desktop Objects".

Primary Examiner—Mark R. Powell
Assistant Examiner—Ba Huynh
Attorney, Agent, or Firm—Gregory M. Doudnikoff

[57] ABSTRACT

A computer programming technique is presented for improving the usability of graphical user interfaces. A snap control is provided with individual elements of the graphical user interface, such as windows or container objects, which upon invocation by a user automatically relocates the associated element at a hide position. Preferably, the hide position utilizes a portion of the desktop beyond the edge of what is displayed to a user, with only a portion of the element having a return snap control button remaining visible to a user.

10 Claims, 5 Drawing Sheets

SNAP CONTROL FOR RELOCATING ELEMENTS OF A GRAPHICAL USER INTERFACE

BACKGROUND OF THE INVENTION

1. Field of the Invention

The present invention relates to a system and method for intuitively moving elements of a graphical user interface in a data processing system. More particularly, the present invention relates to a system and method by which a user moves elements mostly beyond the edges of a display screen to create a less cluttered workplace while maintaining a frame of reference.

2. Description of the Related Art

Graphical user interfaces (GUIs) are routinely employed by software programs operating in data processing systems to simplify their user interfaces or make the software programs "user friendly". A GUI typically utilizes a "desktop" or "workplace" which is presented to a user via a display screen. In the pervasive windowing-based GUIs used by many operating systems and computer software programs, a user is required to recognize and utilize a myriad of GUI elements or objects. An object is a visual component of a user interface which a user works with to perform a task. An object can appear as text, a pictorial representation (also known as a glyph), or a combination of both. Different types of objects include icons, windows, tool bars, face plates, buttons, etc. Objects are usually different in different programs, and often change for different desktops in the same program. The size of a desktop that may be viewed at any given time is limited, and given the often large quantity of objects typically available for use in a given desktop, what is known as the messy desktop scenario becomes a problem. Often work space is at a premium given the prevalence of items presented in a typical desktop. Further, as users navigate through a GUI, they often have trouble keeping a sense of orientation.

A window is an area with visible boundaries with which a user conducts a dialog with a computer system. A window is a GUI element that presents a view of an object, and is typically relatively large. A minimize button is provided with most windows and was an early technique which permitted users to attempt to exert control over the workplace. When a user selects the minimize button for an open window, the window is closed and the base object for which the window provides a dialog is placed in the GUI. However, the minimize function works only with windows, and is not entirely intuitive. Users still have difficulty finding relatively small individual GUI elements such as icons and working or keeping a sense of orientation around open windows, face plates or other large GUI elements.

Another technique available to users for manipulating the location of elements in the desktop is known as "drag and drop". By manipulating a mouse and a mouse button, users are able to drag certain elements, such as windows and some containers, to new locations within the desktop, where they are "dropped". Drawbacks to this technique include that "drag and drop" is relatively slow, sometimes requires the element to be dragged and dropped more than once to position it to the desired location, is not particularly intuitive (especially for novice users) and provides no technique for automatically returning the element to its original position when the user so desires (the user must remember the original location, and drag and drop the element back to the original location).

The above discussed techniques may in fact add to a user's confusion, as they are arbitrary. During the course of a session with a program's GUI, the workplace may change significantly, and a user may experience trouble maintaining a sense of a frame of reference relative to the elements in a GUI.

Logically, the desktop or workplace does not end at the edge of a display screen, but rather has no boundaries. However, most users have difficulty conceptualizing this, and thus the area beyond the boundaries of the display screen or workplace is under-utilized. Getting users to utilize the area beyond the edges of the workplace or display screen could assist in reducing the messy desktop problem. However, the frame of reference issue must be kept in mind. One attempt to get users to think of the area beyond the edges of a typical display or workplace has been the use of a zoom control, which permits a user to zoom in to view a small portion of the desktop and zoom out to view a larger portion of the desktop. As the view of the desktop zooms in or out, the size of the GUI elements and the distance between the elements change to reflect the zooming. While a step in the right direction, this approach still does not entirely resolve the frame of reference problem, as it still would not be intuitive to a user that certain elements are beyond the edge of the display or visible workplace, much less the relative location of these elements.

SUMMARY OF THE INVENTION

Accordingly, an object of the present invention is to provide a technique for enabling the user to intuitively use space beyond the edge of the display or visual desktop or workplace.

Another object of the present invention is to provide a system and method for permitting users of GUIs to more effectively utilize their desktop.

Yet another object of the present invention is to effectively expand the area of a desktop being utilized by a user.

Still another object of the present invention is to provide a system and method for intuitively moving objects to less intrusive locations while enabling the user to maintain a frame of reference.

Other objects and advantages of the present invention will be set forth in part in the description and the drawings which follow, and, in part, will be obvious from the description, or may be learned by practice of the invention.

To achieve the foregoing objects, and in accordance with the purpose of the invention as broadly described herein, computer readable code is provided for moving a graphical user interface element from a first position in a graphical user interface desktop displayed on a display screen. The code comprises first subprocesses for causing a computer to display at least one first user selectable component associated with the graphical user interface element; and second subprocesses for automatically causing the computer to move the graphical user interface element, upon user selection of the first user selectable component, to a second position in the desktop. The computer readable code may further comprise third subprocesses for causing the computer to display a second selectable component when the graphical user interface element is in the second position; and fourth subprocesses for causing the computer to move the graphical user interface element to the first position in the graphical user interface upon user selection of the second selectable component. Preferably, the second position within the desktop permits only a portion of the graphical user interface element to remain visible along an edge of a displayed portion of the desktop, and the second selectable component is within the portion of the graphical user interface element which remains visible. The first user selectable component preferably is positioned along an edge of the graphical user interface element.

When the graphical user interface element is rectangular, four first user selectable components can be displayed, one being disposed along each edge of the graphical user interface element. The second position may be determined based on which of the four user selectable components is selected, the second subprocesses further causing the computer to move the graphical user interface element to the edge of the displayed portion of the desktop which faces the edge of the graphical user interface element along which the selected first user component is located. The second position may be predetermined, or the computer readable code may further comprise fifth subprocesses for permitting a user to define the second position for each of the first user selectable components. Each of the user selectable components may include a directional arrow displayed therein indicating a relative direction of the second position.

Additionally, the present invention provides computer readable code for relocating an element of a graphical user interface from an original position to a hide position, comprising first code means for causing a computer to display at least one user selectable component as part of the element; and second code means for causing the computer to store original position information, delete the element from the original position, and recreate the element at the hide position upon selection of the user selectable component. Preferably, the hide position overlaps the edge of the viewable portion of the graphical user interface such that only a portion of the element is visible. The second code means may further cause the computer to recreate the element at the hide position so that at least one of the user selectable components is visible. The computer readable code may further comprise third code means for causing the computer to access the stored original position information, delete the element from the hide position, and recreate the element at the original position in accordance with the stored original position information upon selection of the user selectable component when the element is in the hide position. The second code means may also causes the computer to modify the element when the element is recreated to a predetermined size.

The present invention will now be described with reference to the following drawings, in which like reference numbers denote the same element throughout.

DESCRIPTION OF THE PREFERRED EMBODIMENT

Figure 1:
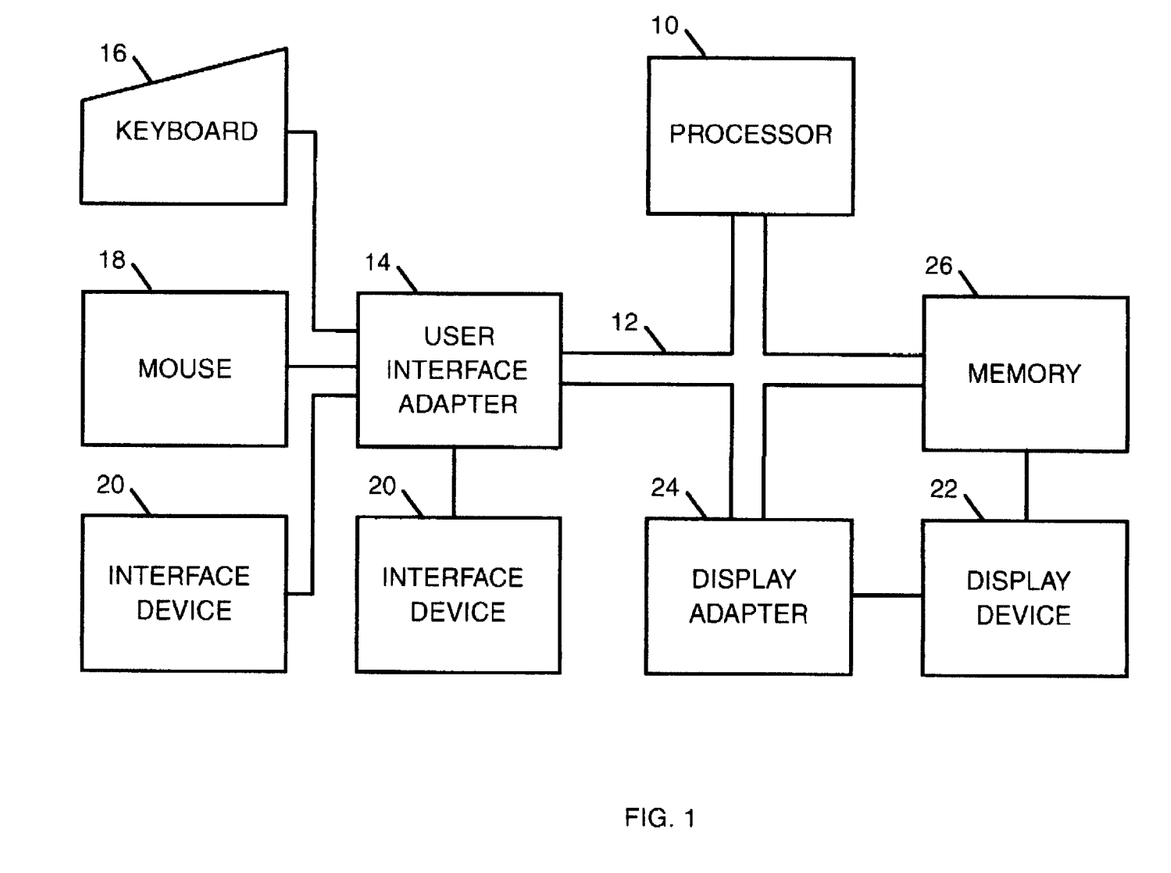
FIG. 1 is a block diagram of a representative hardware environment in which the present invention may be practiced.

The present invention may be performed in any of a variety of known computing environments. FIG. 1 illustrates a representative hardware environment in which the present invention may be practiced. The environment of FIG. 1 is representative of a conventional single user computer workstation such as a personal computer and related peripheral devices. The environment includes a microprocessor 10 and a bus 12 employed to connect and enable communication between the microprocessor 10 and the components of the workstation in accordance with known techniques. The workstation will typically include a user interface adapter 14, which connects the microprocessor 10 via the bus 12 to one or more interface devices, such as a keyboard 16, a mouse 18, and/or other user interface devices 20, which can be any user interface device, such as a touch sensitive screen, digitized pen entry pad, etc. The bus 12 also connects a display device 22, such as an LCD screen or CRT, to the microprocessor 10 via a display adapter 24. The bus 12 also connects the microprocessor 10 to memory 26, which can include ROM, RAM, hard drives, etc. Software which employs the present invention is typically stored in the memory 26 in a standalone workstation environment.

Computer-usable code or a software program which includes the processes of present invention may be embodied and transferred on any of a variety of media, such as CD-ROM or diskettes, for use by a computer system of the type illustrated in FIG. 1. Additionally, such code or software program may be embodied in computer memory and distributed or transferred over networks for use by users with their computer systems. Both of these scenarios and other means for embodying function defined by code are well known in the art and will not be further discussed.

Figure 2:
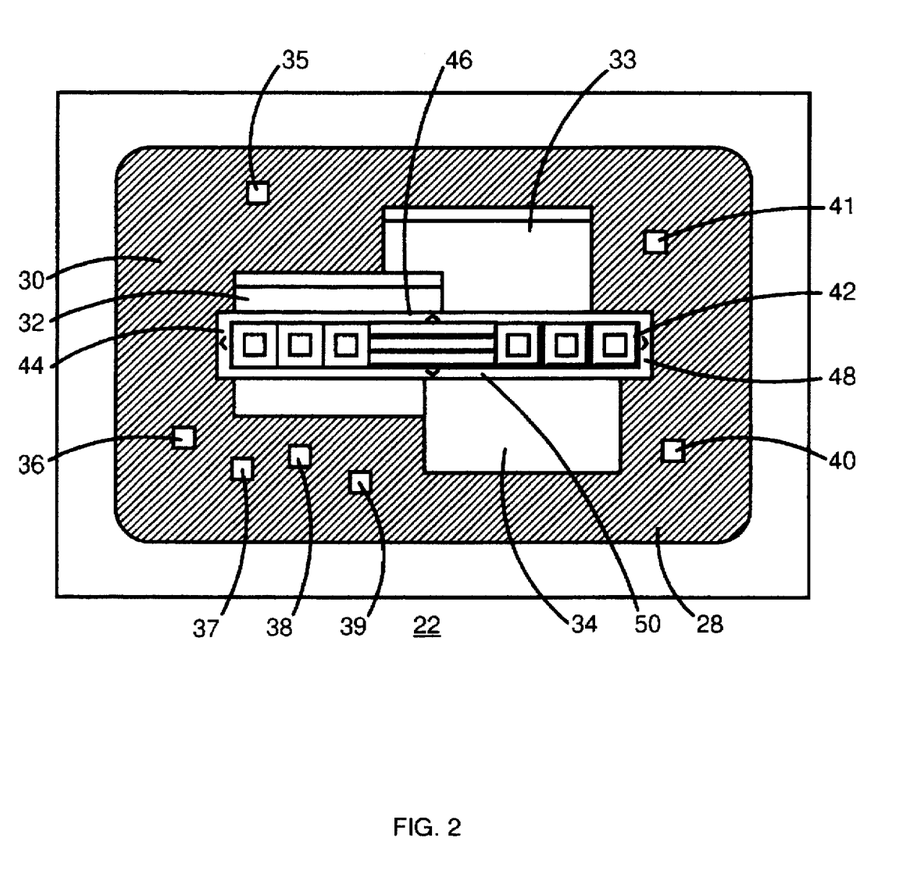
FIG. 2 illustrates a graphical user interface displaying a container which employs the present invention.
Figure 3:
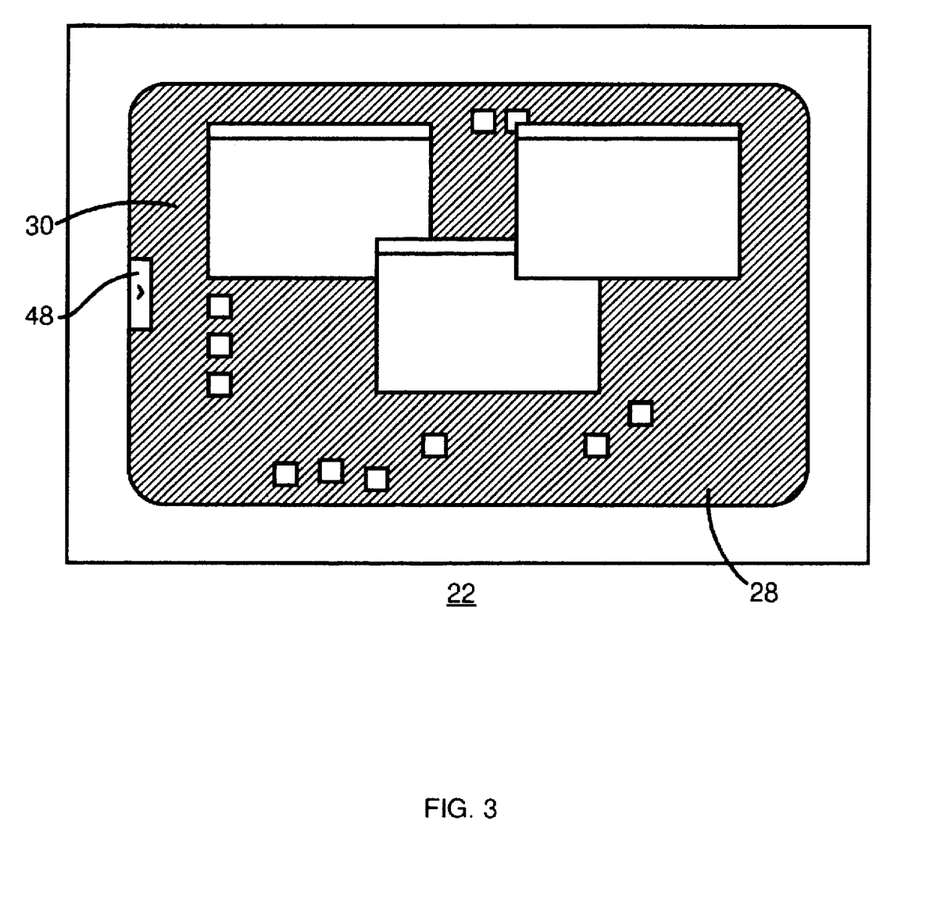
FIG. 3 illustrates a graphical user interface showing the container of FIG. 2 moved in accordance with the control technique of the present invention.
Figure 4:
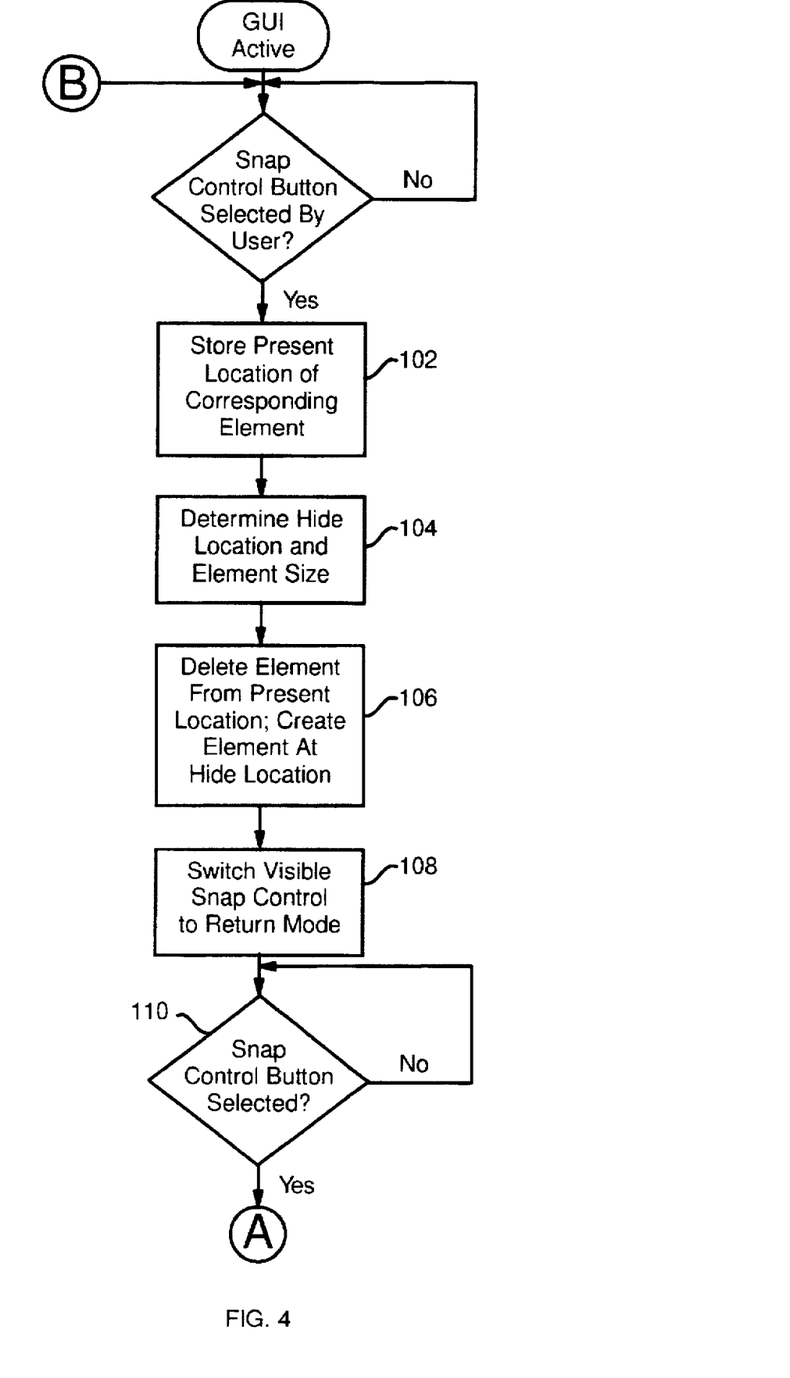
FIG. 4 is a flow chart which illustrates the operation of the processes of the present invention.
Figure 4B:
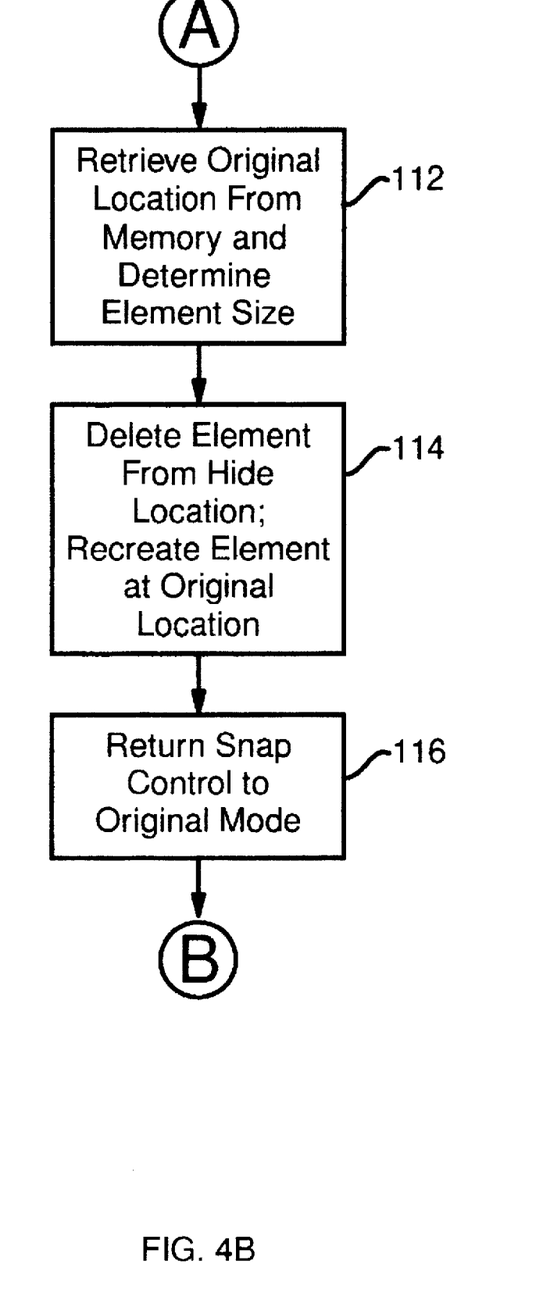

The present invention will now be described with reference to FIGS. 2 through 4. FIG. 2 illustrates the display device 24 having a screen 28 with a workplace or portion 30 of a desktop of a typical GUI substantially coextensive with the screen 28. The workplace 30 includes a number of GUI elements, including a first window 32, a second window 33, a third window 34, icons 35, 36, 37, 38, 39, 40, 41, and a toolbar 42. The toolbar 42 is a particular type of object known as a container. A container is an object which holds other objects, and typically includes objects which a user accesses or utilizes frequently, such as icons representing print and delete functions, folders representing data or files that a user regularly accesses, etc. A user typically wants to keep the toolbar 42 easily accessible for quickly manipulating data, performing functions or accessing additional data or files. However, the toolbar 42 consumes a relatively large area of the displayed portion 30 of the desktop. Accordingly, if the user requires more clear space within the workplace 30, the toolbar 42 must be moved or minimized or it will become hidden behind new windows as they are opened by the user. Moving the toolbar 42 through drag and drop, minimizing the toolbar 42, or having the toolbar 42 become hidden from sight are not optimal for ease of use and convenience.

In accordance with the preferred embodiment of the present invention, the toolbar 42 includes four snap control buttons 44, 46, 48, 50 which, upon selection by a user, invoke their corresponding snap control. The left snap control button 44 is situated along the left edge of the toolbar 42, the top snap control button 46 is situated along the top edge of the toolbar 42, the right snap control button 48 is situated along the right edge of the toolbar 42, and the bottom snap control button 50 is situated along the bottom edge of the toolbar 42. Preferably, the snap controls function to instantly relocate the toolbar 42 to a position in the logical desktop such that only one of the four snap control buttons 44, 46, 48, 50 remains visible within the displayed portion 30 of the desktop. When a user manipulates or selects one of the snap control buttons 44, 46, 48, 50 by, for example, clicking a mouse button when the mouse cursor is located on one of the snap controls, the toolbar 42 is moved so that only a small portion of the toolbar 42 remains visible along an edge of the displayed portion 30 of the desktop.

In the preferred embodiment, directional arrows are provided in each of the snap control buttons so that use of the snap controls is intuitive. As illustrated in FIG. 2, the left, top, right and bottom snap control buttons 44, 46, 48, 50 are provided with left, up, right and down directional arrows, respectively. Manipulation or selection of the left snap control button 44 moves the toolbar 42 logically to the left in the desktop such that only the right snap control button 48 of the toolbar 42 remains in the displayed portion 30 and thus visible to the user. The result of selecting the left snap control button 44 of the toolbar 42 of FIG. 2 is illustrated in FIG. 3. According to the preferred embodiment, selection of the right snap control button 48 when the toolbar 42 is logically positioned at the left edge of the displayed portion 30 of the desktop as illustrated in FIG. 3 results in the toolbar 42 being returned to its original location in the displayed portion 30 of the desktop, which is illustrated in FIG. 2.

Selection of the other snap control buttons 46, 48, 50 when the toolbar 42 is situated in the desktop as illustrated in FIG. 2 will have logically similar results. Selection of the top snap control button 46 logically moves the toolbar 42 up so that only the bottom snap control button 50 is visible to the user at the top of the displayed portion 30 of the desktop; selection of the right snap control button 48 logically moves the toolbar 42 in the desktop so that only the left snap control button 44 is visible to the user at the right edge of the displayed portion 30 of the desktop; and selection of the bottom snap control button 50 logically moves the toolbar 42 down in the desktop and results in only the top snap control button 46 being visible to the user at the bottom of the displayed portion 30 of the desktop.

The exact location of the toolbar 42 logically in the desktop and the size and positioning of the visible part of the toolbar 42 along the edge of the displayed portion 30 may be implemented in many different ways. According to the preferred embodiment, upon selection of one of the snap controls, the toolbar 42 is moved along the appropriate X or Y coordinate direction to the left, up, to the right, or down. The only piece of the toolbar 42 which remains visible along the edge of the displayed portion 30 of the desktop is the opposite snap control button relative to the selected snap control. That is, if the user selected the left snap control button 44, the right snap control button 48 will be visible along the left edge of the displayed portion 30 of the desktop directly to the left of the original position of the toolbar 42, and will be the only portion of the toolbar 42 visible to the user. When the user subsequently selects the right snap control button 48, the toolbar 42 will return to its location prior to the selection of the left snap control button 44.

Alternatively, the exact size and/or location of the visible part of the toolbar 42 along the left, top, right or bottom edge of the displayed portion 30 of the desktop can be set according to different desired results or depend on what is displayed in the displayed portion 30. For example, when the top or bottom snap control buttons 46, 50 are selected, the width of the remaining visible piece of the toolbar 42 can be resized so that the visible portion at the edge of the displayed portion 30 consumes less space. A similar manipulation may be performed when the left or right snap controls are associated with containers which are taller than the toolbar 42 of FIG. 2. Further, the toolbar 42 can be moved such that the portion remaining visible is situated along the edge of the displayed portion of the desktop 30 such that it is not placed on top of or behind an open window or other GUI elements which are already located near or extend beyond the edge. In this situation, if unoccupied space exists along the edge on one side or the other of the existing GUI element, the toolbar 42 would be moved so that the visible portion appears in the unoccupied edge area.

The logical steps of the present invention will now be described with reference to the flowchart of FIG. 4. GUIs are commonly object oriented in nature, being coded in C++ or Smalltalk, for example, and most of the GUI elements are object oriented "objects". In the preferred embodiment, each snap control employed in a GUI is an object associated with (and part of) its GUI element, which itself is often an object. One advantage of object oriented technology is that the individual objects, which are the underlying code components, may be re-used and easily modified. Objects communicate with each other by sending messages. This feature of object oriented technology is leveraged by the present invention, and this feature as well as all other features and attributes of object oriented technology are known to those skilled in the art, and will not be discussed in greater detail.

Snap controls may be employed with any number of GUI elements provided in a GUI. They are most effective with elements which use relatively large amounts of area, such as windows or containers. The snap controls are reactive in nature, such that no action is performed until a snap control button is selected by a user. When a snap control is invoked by a user by selecting a snap control button (Step 100), the present position of its associated GUI element within the displayed portion 30 of the desktop and the size of the element (if the size will be changed when the element is relocated) are stored in memory (Step 102). The display controller controls what is displayed in the GUI and where it is displayed, in accordance with the associated program and user input. The display controller already has data necessary for creation of each element of the desktop. The display controller is known in the art and works in conjunction with controls such as snap control in accordance with known techniques. Next, the new location of the container within the desktop is determined (Step 104). If the element is to be resized before it is recreated at its hide location, the resizing will be carried out at this time in accordance with logic contained in the snap control in conjunction with the display controller, in accordance with known techniques. Each snap control object preferably includes data and logic which defines where its associated GUI element will be moved within the desktop and which portion of the GUI element will remain visible within the displayed portion 30 of the desktop after the GUI element is moved. Both of these may be prescribed by the programmer or set by the programmer to default settings. In the second scenario, users are able to modify the settings to suit their needs. Based upon the predefined or set information, the snap control object calculates the new position of the GUI element within the desktop, and communicates this information to the display controller, which recreates the GUI element at that position. The process of positioning and displaying a GUI element is well known to those skilled in the art.

After the new location is determined, the display controller deletes the GUI element from its original position and causes it to be recreated at its hide location in the desktop (Step 106). Only that portion of the GUI element within the displayed portion 30 of the desktop is visible to the user. In the preferred embodiment, the new location within the desktop is preferably such that just an edge or piece of the GUI element containing the opposing snap control button is visible in the display portion 30 of the desktop. Additionally, the object corresponding to the selected snap control sends a message to the object corresponding to the snap control which will remain visible, informing it to switch logic modes, such that upon selection, it will cause the GUI element to return to its original location (Step 108). Alternatively, all of the snap controls may switch modes. This may be desired in case the view of the desktop being displayed is changed or the element is dragged and dropped within the desktop so that other buttons become visible. Upon selection of any snap control button, the GUI element will return to its original position.

Following relocation of the GUI element, the object corresponding to the opposing snap control waits in a reactive mode until its button is selected. Upon selection (Step 110), the object causes processing to be initiated which returns the GUI element to its original location in the desktop. In the preferred embodiment, the processing steps include retrieving the stored information regarding the GUI element's original location and size characteristics (if stored) from memory and providing this information to the display controller (Step 112). The display controller then causes the image of the GUI element to be deleted from its hide location in the desktop and recreated and displayed at its original location in its original form (Step 114). The once selected snap control object then returns to its original mode (Step 116) and awaits invocation by the user (Step 100).

A number of variations to the preferred embodiment are possible. For example, the entire GUI element need not necessarily be moved within the desktop. The piece of the GUI element which is displayed along the edge of the displayed portion 30 of the desktop may be the only part of the GUI element still logically in existence within the desktop. Upon selection of the visible snap control, the entire GUI element would then be recreated and displayed in its original location. Alternatively, selection of one of the snap controls can cause the GUI element to be resized to a predetermined size and/or placed in a predetermined position along the edge of the displayed portion 30 of the desktop.

Further, the use of four snap controls is not required, and may not be practical in situations in which the GUI element is not rectangular or the GUI element is small. A pair of snap controls on opposing sides of the GUI element may be employed, or a single snap control can be employed. In the case of a single snap control, the associated GUI element need not be necessarily moved to the location indicated by a directional arrow, but can be moved to a predetermined location. The logic of the snap control object would provide for, following selection, the creation of a "return" snap control button visible at an edge of the displayed portion 30 or moving the single snap control button relative to its GUI element to a position adjoining the GUI element so that the button will be visible along an edge of the displayed portion 30 while the rest of the GUI element is not visible. The return snap control logic would return the snap control button and its associated GUI element to their original respective positions in the desktop upon selection of the snap control button. Alternatively, a snap control object may be included in the underlying code for some or all of the elements in a GUI, but include logic such that snap control buttons are not created and displayed unless the associated element covers an area in the displayed portion 30 at least as large as a predetermined minimum area.

Additionally, if multiple GUI elements in a desktop include a snap control, each GUI elements could be moved to a substantially common position at an edge of the desktop upon selection of its button. If a first GUI element has already been moved to the hide location when the snap control for a second GUI element is invoked, the first GUI element is moved in slightly and the second GUI element is placed on top of the first GUI element in the original hide location of the first GUI element so that a stair step effect is obtained of the visible snap control buttons along the edge of the displayed portion 30 of the desktop. Preferably, the snap control button associated with the second selected GUI element would be visible along the edge of the displayed portion 30 and the snap control button associated with the first selected GUI element would be visible in the displayed portion 30 just to the inside of the snap control button for the second GUI element. To assist the user in maintaining a frame of reference, depressing and holding down the cold or right mouse button when the mouse cursor is over one of the two stair-stepped snap controls causes the associated GUI element to be temporarily displayed in its original location for as long as the button is depressed. Alternatively, some type of name of the hidden GUI element may be displayed in a pop-up window near the snap control button while the right mouse button is depressed.

While the preferred embodiment of the present invention has been described, additional variations and modifications in that embodiment may occur to those skilled in the art once they learn of the basic inventive concepts. Therefore, it is intended that the appended claims shall be construed to include both the preferred embodiment and all such variations and modification as fall within the spirit and scope of the invention.

I claim:

1. Computer readable code stored on computer-readable medium for moving a window from a first position in a graphical user interface desktop displayed on a display screen, comprising:

first subprocesses for causing a computer to display at least one first user selectable component associated with the window;

second subprocesses for automatically causing the computer to move the window, upon user selection of one of the at least one first user selectable components, to a second position in the desktop associated therewith, wherein the second position permits only a portion of the window to remain visible along an edge of the displayed portion of the desktop; and third subprocesses for causing the computer to display a second user selectable component when the window is in the second position; and fourth subprocesses for causing the computer to move the window to the first position in the graphical user interface upon user selection of the second selectable component wherein each of the user selectable components includes a directional arrow displayed therein indicating a direction of movement of the window when the component is selected by the user.

2. Computer readable code for moving the window according to claim 1, wherein the second position within the desktop permits only a position of the window to remain visible along an edge of a displayed portion of the desktop, and wherein the second selectable component is within the portion of the window which remains visible.

3. Computer readable code for moving the window according to claim 1, wherein the first user selectable component is positioned along an edge of the window.

4. Computer readable code for moving the window according to claim 1, wherein the window is rectangular and four of the first user selectable components are displayed, one being disposed along each edge of the window, and wherein the second position is determined based on which of the four user selectable components is selected, said second subprocesses further causing the computer to move the window to the edge of the displayed portion of the desktop which faces the edge of the window along which the selected first user component is located.

5. Computer readable code for moving the window according to claim 1, wherein the second position is predetermined.

6. Computer readable code stored on medium for relocating a window of a graphical user interface from an original position to one of at least two hide positions, comprising:

first code means for causing a computer to display at least two user selectable components as past of the window disposed along different edges of the window, each of the user selectable components having a directional arrow associated therewith which indicates a relative position of a hide position associated therewith; and second code means for causing the computer to store original position information, delete the window from the original position, and recreate the window at the hide position associated with a selected user selectable component upon selection of one of the user selectable components, wherein the hide positions are logically situated so that only a portion of the window is visible within the graphical user interface.

7. Computer readable code for relocating the window of a graphical user interface according to claim 6, wherein said second code means further causes the computer to recreate the window so that at least one of the user selectable components is within the visible portion of the window.

8. Computer readable code for relocating the window of a graphical user interface according to claim 7, further comprising third code means for causing the computer to access the stored original position information, delete the window from the hide position, and recreate the window at the original position in accordance with the stored original position information upon selection of the user selectable component when the window is in the hide position.

9. Computer readable code for relocating the window of a graphical user interface according to claim 6, wherein said second code means causes the computer to resize the window to a predetermined size when the window is recreated.

10. Computer readable code for relocating the window of a graphical user interface according to claim 6, wherein said first code means displays the user selectable component if the window has an area larger than a predetermined minimum area.

* * * * *